United States Patent

[11] 3,569,704

[72] Inventor John P. Mitchell
 Summit, N.J.
[21] Appl. No. 752,940
[22] Filed Aug. 15, 1968
[45] Patented Mar. 9, 1971
[73] Assignee Granted to U.S. Atomic Energy Commission
 under the provisions of 42 U.S.C. 2182

[54] RADIATION DOSIMETER
 5 Claims, 4 Drawing Figs.
[52] U.S. Cl................................................. 250/83.3,
 250/83, 317/234
[51] Int. Cl.................................................. G01t 1/02
[50] Field of Search.................................... 250/83.3,
 71.5; 317/235/27, 234; 250/83

[56] References Cited
 UNITED STATES PATENTS
 3,117,229 1/1964 Friedland....................... 250/83.3

3,225,198 12/1965 Mayer........................... 250/83.3
3,396,318 8/1968 Chow............................ 250/83.3X Primary Examiner—Ralph G. Nilson
Assistant Examiner—Davis L. Willis
Attorney—Roland A. Anderson ABSTRACT: A dosimeter for measuring high energy ionizing radiation utilizes a metal-oxide-semiconductor (MOS) structure as the sensing element. Advantageously, the MOS structure comprises a silicon wafer a portion of one surface of which is oxidized and then provided with an aluminum electrode. In one embodiment, provision for heating the MOS structure and for measuring its temperature is incorporated in the MOS structure. After exposure to ionizing radiation the MOS structure is heated with an ammeter connected between the silicon wafer and aluminum electrode. The integrated current flow is then a measure of the radiation dose received by the structure.

PATENTED MAR 9 1971         3,569,704

INVENTOR
J. P. MITCHELL
BY
Arthur J. Torsiglieri
ATTORNEY

RADIATION DOSIMETER

GOVERNMENT CONTRACT

The invention herein claimed was made in the course of, or under contract with the Air Force.

This invention relates to dosimetry and relates more particularly to the measurement of high-energy, ionizing radiation, such as X-rays and gamma rays by use as the sensing element of a structure including a semiconductive crystal, a portion of one surface of which includes in turn an insulating layer, and an electrode to form a metal-insulator-semiconductor structure.

BACKGROUND OF THE INVENTION

Detection and measurement of high energy radiation have long been important in the physical and the life sciences, and a wide variety of techniques have been evolved over the years. One of the most important in current use involves thermoluminescence.

As currently practiced, thermoluminescence dosimetry involves the irradiation of a sensing element, such as manganese-activated calcium fluoride or doped lithium fluoride, with the radiation to be measured and thereafter heating the irradiated element to induce luminescence which is supplied to a photomultiplier which provides a current which when integrated is a measure of the radiation dose.

While sensitive, this technique is complex and requires expensive equipment to instrument.

SUMMARY OF THE INVENTION

In accordance with the present invention, the sensing element used comprises a sandwich of a semiconductive crystal, an insulating layer, and a suitable metal electrode. Advantageously, the sandwich comprises a silicon crystal, an intermediate layer of silicon dioxide, and an aluminum or gold on chromium electrode. When the sensing element is exposed, the ionizing radiation serves to create hole-electron pairs within the insulating layer. Some hole-electron pairs recombine while others are trapped in electron and hole traps. Because the electrons are considerably more mobile than the holes more electrons than holes may escape from the silicon dioxide layer leaving a positive space-change in the silicon dioxide. This charge pattern is quite stable with time so long as the device is kept at or near room temperature. However, when the device is heated, for example, to 200° C., there will flow in an ammeter, connected between the metal electrode and the semiconductive crystal, current which when integrated is a measure of the radiation dose received by the MOS structure.

Advantageously, there is included in the silicon crystal a diffused resistive portion which, when supplied with current, acts as a heater to heat the silicon chip. Optimally, the silicon crystal also includes in one portion a diffused PN junction a measure of whose impedance can be used to determine the temperature of the silicon crystal and to control the heater power to give a desired rate of increase of temperature during the heating cycle.

Figure 1:
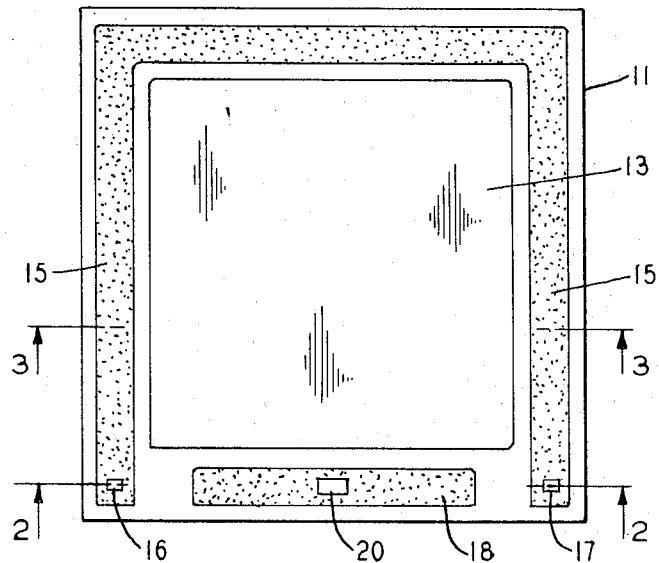
FIG. 1 shows a plan view of a suitable sensing element for use in the invention.

The drawing is not to scale with respect to the thicknesses of the various layers of the semiconductive crystal and the oxide.

DETAILED DESCRIPTION OF THE INVENTION

Figure 3:
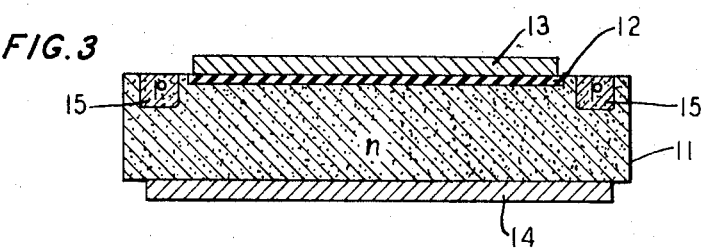

With reference now to FIGS. 1 and 3, a silicon crystal 11 is provided with a central portion where one surface is oxidized to provide an oxide layer 12 over which lies the field electrode 13. An electrode 14 makes low resistance ohmic connection to the opposite surface of the crystal.

Typically, the crystal 11 may be a wafer 100 mils square and 20 mils thick, the bulk of which is of N-type with a relatively high resistivity of 4 ohm-centimeter. The oxide layer 12 may be 60 mils square and 2 microns thick. The electrodes 13 and 14 may be of aluminum or gold on chromium.

Additionally, along three sides of the oxide layer there extends within the crystal the P-type resistivity region 15, typically formed by the selective diffusions of acceptor impurities to produce the desired resistivity. Electrodes 16 and 17 make low resistance connection to opposite ends of the region 15.

The region 15 together with its associated electrodes 16 and 17 serves as a heater such that by the application of a voltage between electrodes 16 and 17 a current flows in region 15 adequate to heat the central portion of the crystal over which lies the oxide layer to a temperature of at least 200° C. in a few seconds, the faster the better usually.

Figure 2:
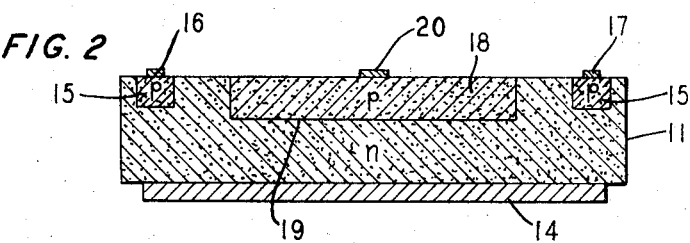
FIGS. 2 and 3 are sections taken along 2-2 and 3-3 of the element shown in FIG. 1.

Along the fourth side of the oxide layer, the crystal includes a P-type zone 18 which forms with the N-type bulk a PN junction 19, as seen in FIG. 2. A low resistance ohmic connection 20 is provided to the zone 18 and the current flow across the PN junction 19 in response to either a forward or reverse bias can be used to monitor the temperature of the crystal.

Figure 4:
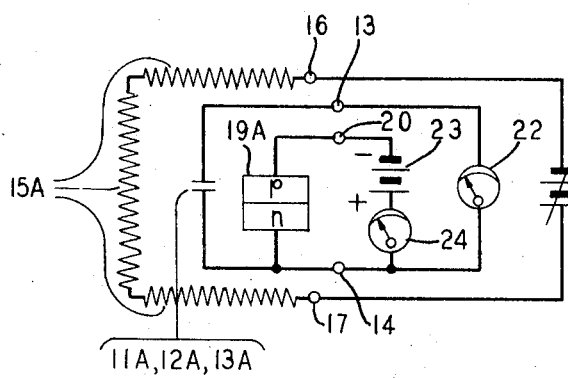
FIG. 4 illustrates the manner in which the sensing element shown in FIG. 1 would be connected with external circuitry to provide a reading of the ionizing radiation with which it had been irradiated.

In FIG. 4, there is shown how the device of FIG. 1 would be interconnected to measure the amount of ionizing radiation to which the device has been exposed. The device is represented by its equivalent circuit in which the suffix A is added to the reference numerals used in FIG. 1 to denote the corresponding elements in the equivalent circuit.

Specifically the heater circuit is completed by connecting a suitable variable DC voltage source 21 between electrodes 16 and 17 to provide current through the resistors 15A.

The detection circuit is completed by connecting between electrodes 13 and 14 a suitable ammeter 22 capable of measuring and integrating currents of the order of picoamperes.

Finally, the thermometer circuit is completed by connecting a DC voltage source 23 poled to bias the PN junction 19A in reverse and an ammeter 24 between electrodes 14 and 20. If desired, there may be included apparatus which uses the current flowing between electrodes 14 and 20 to control the voltage of the heater supply 21 and, in turn, the temperature of the crystal.

When a metal-oxide semiconductor structure is exposed to ionizing radiation, hole-electron pairs are generated substantially uniformly throughout the oxide layer. Some of the hole-electrons pairs will recombine while others will exist in the oxide layer as trapped holes and electrons in the form of compensated charge. (A positive space-charge also occurs in the oxide and arises because the electrons generated by the radiation are much more mobile than the corresponding holes and tend to drift or diffuse out of the oxide more readily. This positive space-charge is not, however, directly involved in the operation of the dosimeter.)

It has been found experimentally that the compensated trapped charge is much larger than the positive space-charge and depends on the radiation dose but is virtually independent of the voltage applied between the silicon and metal electrode during irradiation.

It has been found that when heated the irradiated device will produce a thermally stimulated current in an ammeter connected between the metal electrode and the silicon body. The direction of this current is such as to require a net injection of electrons into the oxide layer from the metal electrode.

The observed effects are consistent with the following proposed mechanism although a complete understanding of the exact mechanism involved is not necessary for the practice of the invention, and so I do not intend to be bound to any particular mechanism.

When the structure is heated, the electrons in the compensated charge which are trapped about 1 electron volt below the oxide conduction band are released. Subsequently, some electrons diffuse out of the oxide but most recombine with more deeply trapped holes. The recombination process is a luminescent one. The light is absorbed by both the metal electrode 13 and the silicon electrode 11 producing photoinjection of electrons into the oxide. The yield from the two electrodes is not the same, however, because of asymmetry in the properties of the metal-oxide and silicon-oxide interfaces. The metal electrode, becaUse of the smaller barrier height at its interface (about 3.2 electron volts) as compared to the barrier height of the silicon interface (about 4.5 electron volts) and/or more favorable absorption characteristics, injects a much larger number of electrons into the oxide than does the semiconductor, producing a net current flow as observed.

The proposed explanation suggests that it is advantageous for large current flow to choose the various materials involved so that the barrier height of the metal electrode-insulator interface is low relative to that of the semiconductor-insulator interface.

The integrated current flow through the structure is found to depend on the radiation dose received, increasing approximately linearly with dosage for doses up to about 1 megarad. From the experiments performed, it is estimated that approximately $10^{-8}$ cm$^3$ of silicon oxide will produce an integrated current of $4 \times 10^{-11}$ coulombs after an exposure of about $3.5 \times 10^5$ rads. This amount of charge is large enough to be measured quite readily with available ammeters and, hence, the integrated thermally stimulated current can be used as a measure of the radiation dose absorbed by the structure, once the particular structure has been calibrated by irradiation with known dosages.

The most appropriate package for the sensing element depends on the type of radiation which it is designed to measure. The packaging, typically, is designed to minimize interception of the radiation to be measured and, in some instances, measures may be taken to intercept other possible ionizing radiation. For energetic radiation greater than approximately 0.5 MeV, a standard transistor package can be employed while for relatively low energy radiation, simple beam lead packaging, including a protective layer of silicon-oxide and silicon-nitride and beam leads comprising layers of titanium, platinum and gold could be used.

Moreover, for passivating purposes it may be advantageous to provide an oxide layer over all of the top surface of the silicon wafer and to form the various desired P-type zones by diffusing through openings formed in the oxide layer in the manner known to workers in the art.

It should be evident that the specific embodiment described is merely illustrative of the general principles of the invention and that various modifications may be made without departing from the spirit and scope of the invention. In particular, it is feasible to employ in the metal-insulator semiconductor structure various other combinations of materials and with other geometrical arrangements of the MOS structure, heater and thermometer. It should also be feasible to adapt the involved phenomenon outside the field of dosimetry in any application where it is desirable to store the effect of high energy radiation and to provide subsequently a current which is a measure of such high energy radiation. Furthermore, the stability of the storage may be enhanced by maintaining the device at temperatures below room temperature.

I claim:

1. A dosimeter for measuring ionizing radiation comprising:
    a semiconductive device comprising a semiconductive crystal, an insulating layer over a portion of one face of said crystal and a metal layer over said insulating layer and a low resistance connection to said crystal, the device being adopted to be irradiated with the radiation to be measured for creating hole-electron pairs in the insulating layer;
    means for heating the semiconductive device after irradiation; and
    means connected between the metal layer and the low-resistance connection of said device for measuring the current flow therebetween in response to the heating of the semiconductive device.

2. A dosimeter in accordance with claim 1 in which the semiconductive crystal is of silicon and the insulating layer is of silicon-oxide.

3. A dosimeter in accordance with claim 1 in which the heating means comprises a separate region of the crystal and means for the passage of current through such region for heating the crystal.

4. A dosimeter in accordance with claim 3 in which the crystal also includes a PN junction and which includes means for measuring the impedance of said junction to provide an indication of the temperature of the crystal.

5. The method of measuring radiation comprising the steps of:
    exposing to the radiation to be measured a semiconductive device comprising a semiconductive crystal with an insulating layer on one surface and a metal electrode over said layer;
    thereafter heating the exposed semiconductive device to a temperature in excess of 200° C.; and
    while heating the device measuring the current flow between the metal electrode and the semiconductive crystal.